US012216952B2

United States Patent
Liao et al.

(10) Patent No.: US 12,216,952 B2
(45) Date of Patent: Feb. 4, 2025

(54) METHOD FOR PRINTING A ZIGBEE INSTALL CODE AND CORRESPONDING SYSTEMS AND DEVICES

(71) Applicant: LEDVANCE GmbH, Garching bei Munich (DE)

(72) Inventors: Wuqiang Liao, Shenzhen (CN); Huajin Huang, Shenzhen (CN); Li Lu, Shenzhen (CN); Caiyun Li, Shenzhen (CN)

(73) Assignee: LEDVANCE GMBH, Garching Bei Munchen (DE)

( * ) Notice: Subject to any disclaimer, the term of this patent is extended or adjusted under 35 U.S.C. 154(b) by 0 days.

(21) Appl. No.: 16/777,113

(22) Filed: Jan. 30, 2020

(65) Prior Publication Data

US 2020/0249894 A1 Aug. 6, 2020

(30) Foreign Application Priority Data

Jan. 31, 2019 (CN) .......................... 201910098415.X

(51) Int. Cl.
*G06F 3/12* (2006.01)
*H04W 84/18* (2009.01)

(52) U.S. Cl.
CPC .......... *G06F 3/1293* (2013.01); *G06F 3/1203* (2013.01); *G06F 3/1238* (2013.01); *G06F 3/1292* (2013.01); *G06F 3/1297* (2013.01); *H04W 84/18* (2013.01)

(58) Field of Classification Search
CPC ..................................................... G06F 3/1293
See application file for complete search history.

(56) References Cited

U.S. PATENT DOCUMENTS

| | | | |
|---|---|---|---|
| 2008/0306443 A1* | 12/2008 | Neer | A61M 5/007 604/121 |
| 2015/0097689 A1* | 4/2015 | Logue | H04L 65/1069 340/632 |
| 2015/0161558 A1* | 6/2015 | Gitchell | G06Q 50/22 235/375 |
| 2016/0082165 A1* | 3/2016 | Alvarez | A61M 1/06 604/74 |
| 2018/0137314 A1* | 5/2018 | Roth | G06K 7/10316 |
| 2018/0176771 A1* | 6/2018 | Yang | H04W 12/06 |
| 2019/0132055 A1* | 5/2019 | Deixler | H05B 47/19 |
| 2019/0394278 A1* | 12/2019 | Fujimoto | G06Q 50/16 |
| 2021/0068198 A1* | 3/2021 | Michielsen | H04L 45/02 |
| 2022/0060496 A1* | 2/2022 | Siraj | H04L 12/2818 |

OTHER PUBLICATIONS

Microsoft Computer Dictionary Fifth Edition.*

* cited by examiner

*Primary Examiner* — Benjamin O Dulaney
(74) *Attorney, Agent, or Firm* — Hayes Soloway PC

(57) ABSTRACT

A method for printing a Zigbee install code includes reading the Zigbee install code from a Zigbee device via a radio interface and printing the Zigbee install code. The Zigbee install code can be read from the Zigbee device before or after assembly of the Zigbee device has been completed.

20 Claims, 1 Drawing Sheet

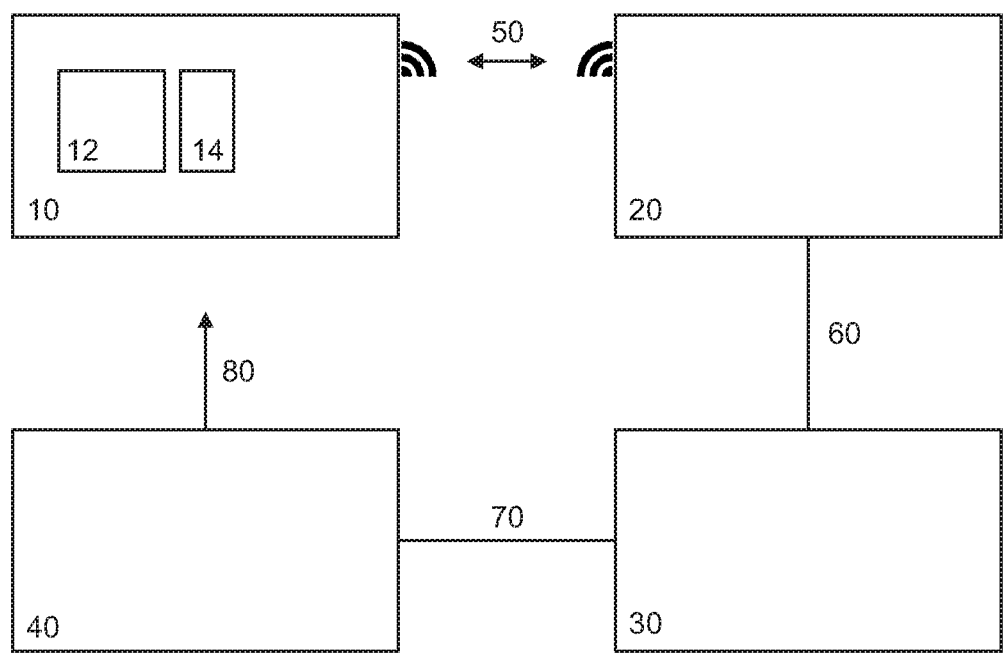

METHOD FOR PRINTING A ZIGBEE INSTALL CODE AND CORRESPONDING SYSTEMS AND DEVICES

CROSS-REFERENCE TO RELATED APPLICATIONS AND PRIORITY

This patent application claims priority from CN Patent Application No. 201910098415.X filed Jan. 31, 2019, which is herein incorporated by reference in its entirety.

TECHNICAL FIELD

The present invention relates to a method for printing a Zigbee install code on a Zigbee device, as well as to corresponding systems and devices.

BACKGROUND

Zigbee is a low-power, low data rate, and close proximity wireless network. Every Zigbee network has a coordinator device acting as a trust center to coordinate, which devices are allowed to join the network.

In Zigbee 3.0 systems, all Zigbee devices capable of joining networks must support the use of install codes. The install code itself is a random value installed on the joining device at manufacturing time, and is used to encrypt the initial message exchange between the device and the trust center (the coordinator).

The install code is typically printed on the case or on the device, either as a hexadecimal string or as a graphical encoding such as a barcode or a QR code, and can be provided to the trust center via an out-of-band mechanism. For example, the install code can be entered into an application running on a smartphone (e.g., by typing or by scanning the graphical encoding) and be sent from the application to the trust center, together the 64-bit IEEE MAC address ("EUI64") of the device. Once these security credentials are known to the trust center, the in-band joining process may be initiated.

As each Zigbee device has its own install code, care must be taken during assembly to print the correct install code on the case or the device. In existing solutions, the install code is read out from the device before the device is fully assembled. The install code is read via a serial interface such as a UART (Universal Asynchronous Receiver Transmitter) interface from the Zigbee controller (usually a System-on-Chip, SoC). To do so, physical access to the connection terminals of the serial interface must be possible, which is usually hidden inside the housing when the device is fully assembled. The read out install code is then written to a NFC (Near Field Communication) card or printed on a label. The NFC card or the label then accompanies the Zigbee device during the further production steps. Once the device is fully assembled, the install code can be printed on the device (or on the case after packaging).

However, there is a chance of mixing up the Zigbee device and the NFC card or label during the production process. If that happens and the wrong code is printed on the device, the device will never be able to join a Zigbee network that uses install code security.

SUMMARY OF THE INVENTION

In view of the known prior art, it is an object of the present invention to provide a method for printing a Zigbee install code overcoming the disadvantages presented above.

This object is solved by a method and a system according to the independent claims. Preferred embodiments are given by the dependent claims.

In a method according to the present invention for printing a Zigbee install code, the Zigbee install code is read from a Zigbee device via a radio interface. The read Zigbee install code is then printed. The Zigbee install code may be printed on the Zigbee device itself and/or on a case intended for the Zigbee device, i.e. a case into which the Zigbee device is to be inserted for example for shipping. Reading the Zigbee install code via a radio interface allows reading the install code even when the electronic components of the Zigbee device (in particular any connection terminals) are not or no longer accessible. It may also be possible that the Zigbee device does not comprise any connection terminals that would allow reading the Zigbee install code by means of physically connecting a serial interface to them.

The term "Zigbee device" herein means a device that is primarily intended for joining a Zigbee (in particular Zigbee 3.0) network, but that may also be able to use other communications protocols such as Bluetooth. The Zigbee device may be a lighting device such as a lamp (often called "smart lamp") or any other Zigbee device.

The Zigbee device may comprise a processing means. The Zigbee install code may have been programmed into a memory area of the processing means or into a separate memory of the Zigbee device. The processing means may be an EFR32MG12 SoC (System-on-Chip) available from Silicon Laboratories Inc.

In an embodiment, the Zigbee device may be assembled, in particular fully assembled, before the Zigbee install code is read from the Zigbee device. In other word, the step of reading the Zigbee install code from the Zigbee device via a radio interface is carried out after the step of assembling the Zigbee device. In that way, the read Zigbee install code may immediately be printed on the Zigbee device and there is no danger of the Zigbee device and an information carrier carrying the install code (such as an NFC card or a label) becoming mixed up.

By directly printing the install code on the Zigbee device after reading it from the Zigbee device, manufacturing becomes quicker as additional step like storing the install code on an information carrier and reading the install code again from the information carrier may be omitted. Also, the costs for the information carrier can be saved.

In an embodiment, the Zigbee install code is read from the Zigbee device via a radio interface using an IEEE 802.15.4 protocol (802.15.4 MAC radio). IEEE 802.15.4 is a standard maintained by the 802.15 working group of the IEEE (Institute of Electrical and Electronics Engineers). The standard intends to offer the fundamental lower network layers of a type of wireless personal area network (WPAN) which focuses on low-cost, low-speed ubiquitous communication between devices. The Zigbee standard is based on the IEEE 802.15.4 standard, reducing the need for additional electronical components in the Zigbee device.

In order to send out the Zigbee install code via the radio interface, the Zigbee device will usually need to be powered up. In case that the Zigbee device is a lamp, the electrical connectors will usually be easily accessible, so that the lamp can be connected to an electrical power source. An external power source may also be used to power up other types of Zigbee devices, usually by connecting to the electrical connectors provided for normal use of the device. Alternatively, an energy storage device such as a (rechargeable) battery may be provided in the Zigbee device.

In an embodiment, the Zigbee install code is read from the Zigbee device by a radio communication unit (also called a Zigbee sniffer install code manufacture tool), wherein the radio communication unit is connected to a printing system. The radio communication unit may comprise a Zigbee SoC such as the EM3588 module available from Silicon Laboratories Inc. The radio communication unit may be provided as a dongle that can directly be inserted into a corresponding port of the printing system or it may be connected to the printing system via a cable.

The printing system may comprise a computer and a printer connected to the computer. The computer may be connected to the radio communication unit via a serial interface, for example a UART interface or a USB interface. The printer is suitable to print the Zigbee install code directly on the Zigbee device or on a case intended for the Zigbee device.

The computer may be a usual personal computer. The computer may be configured to convert the Zigbee install code read from the Zigbee device into a graphical representation thereof. The computer would then control the printer such that the printer prints the graphical representation of the Zigbee install code and/or a numerical (including hexadecimal) representation thereof.

The term "Zigbee install code" as used herein includes the actual install code required for the Zigbee device to join a Zigbee network. It may also include further information, such as the 64-bit IEEE MAC address ("EUI64") of the Zigbee device or further manufacturing specific information such as manufacturer ID, device ID, device type, firmware version, production date, etc. Such further information may also be included in the graphical representation and/or may also be printed on the Zigbee device and/or the case intended for the Zigbee device.

The present invention further relates to a system for printing a Zigbee install code, in particular in accordance with the method described herein. The system comprises a radio communication unit for reading the Zigbee install code from a Zigbee device via a radio interface and a printing system for printing the Zigbee install code.

In an embodiment, the radio communication unit is configured to read the Zigbee install code from the Zigbee device via the radio interface using an IEEE 802.15.4 protocol.

In an embodiment, the printing device comprises a computer (for example a conventional personal computer) and a printer connected to the computer. The computer may be connected to the radio communication unit via a serial interface, for example a UART interface.

The present invention further relates to a Zigbee device comprising a radio interface for transmitting a Zigbee install code, in particular using an IEEE 802.15.4 protocol.

In order to enable the communication between Zigbee device and radio communication unit, the Zigbee device may need to be provided with software (firmware) allowing such communication. The software may be installed on the Zigbee device (for example on the Zigbee SoC) during manufacture. The software of the Zigbee device may have at least two modes, a manufacture mode and a normal Zigbee mode. Only one of the modes may be active at one time. The software may be configured such that, upon the first power up of the Zigbee device, the software is running in manufacture mode. Thus, communication with the radio communication unit using an IEEE 802.15.4 protocol would be possible.

The software may further be configured to leave the manufacture mode and enter the normal Zigbee mode upon receiving a "quit manufacture mode" command. Such a command could be issued by the radio communication unit once the Zigbee install code has been successfully read out from the Zigbee device, once the Zigbee install code has been successfully printed on the Zigbee device or the case, or at any other time, preferably before the Zigbee device leaves the factory. Once the software of the Zigbee device has left manufacture mode and entered normal Zigbee mode it may permanently stay in normal Zigbee mode, in order to prevent any attempts to read out the Zigbee install code by unauthorized persons. Only erasing the SoC and re-installing the software may allow to enter the manufacture mode again.

The features described above with reference to the method may also be applied to the system and the device and vice versa.

BRIEF DESCRIPTION OF THE DRAWINGS

Preferred embodiments of the invention will be explained in the following, having regard to the drawing. It is shown in:

FIG. 1 a schematic representation of a system according to the present invention.

DETAILED DESCRIPTION OF THE INVENTION

In the following, preferred embodiments of the invention will be described with reference to the drawings. The same or similar elements or elements having the same effect may be indicated by the same reference number in multiple drawings. Repeating the description of such elements may be omitted in order to prevent redundant descriptions.

FIG. 1 shows a schematic representation of a system according to the present invention. A Zigbee device 10 (such as a lighting device) comprises processing means 12 and a memory 14 storing a Zigbee install code as well as the EUI64 of the Zigbee device 10. The memory may also store further information.

A radio communication unit 20 (also called a Zigbee install code manufacture tool) communicates with the Zigbee device 10 wirelessly 50 via an IEEE 802.15.4 protocol and reads the Zigbee install code (together with the EUI64) from the Zigbee device 10.

The radio communication unit 20 is connected via a UART interface 60 with a computer 30, which is configured (i.e. runs an application) to convert the Zigbee install code (and any potential further information that has been read from the Zigbee device 10 by the radio communication unit 20) into a graphical representation (e.g. QR code) thereof.

A printer 40 is connected in a conventional way (such as via USB 70) to the computer 30. The application running on the computer 30 then controls the printer 40 to print 80 the QR code generated by the application on the Zigbee device 10.

Alternatively or additionally, the Zigbee install code may be printed in a hexadecimal or other representation.

Although the invention has been illustrated and described in detail by the embodiments explained above, it is not limited to these embodiments. Other variations may be derived by the skilled person without leaving the scope of the attached claims.

Generally, "a" or "an" may be understood as singular or plural, in particular with the meaning "at least one", "one or more", etc., unless this is explicitly excluded, for example by the term "exactly one", etc.

In addition, numerical values may include the exact value as well as a usual tolerance interval, unless this is explicitly excluded.

Features shown in the embodiments, in particular in different embodiments, may be combined or substituted without leaving the scope of the invention.

The invention claimed is:

1. A method for printing a Zigbee install code associated with a Zigbee device and required for said Zigbee device to join a Zigbee network, the method comprising:
   causing the Zigbee device to enter a first mode of operation in which communication between the Zigbee device and a radio interface external to the Zigbee device is possible;
   reading the Zigbee install code from the Zigbee device via the radio interface in the first mode of operation and subsequently printing the read Zigbee install code; and
   causing the Zigbee device to transition from the first mode of operation to a second mode of operation in which any attempt by unauthorized persons to read the Zigbee install code from the Zigbee device is prevented, wherein the transition from the first mode of operation to the second mode of operation occurs upon receipt by the Zigbee device of a command signal from the radio interface external to the Zigbee device.

2. The method according to claim 1, wherein reading the Zigbee install code from the Zigbee device via the radio interface is carried out after the Zigbee device has been assembled.

3. The method according to claim 1, wherein printing the Zigbee install code comprises:
   printing the read Zigbee install code at least one of:
      on the Zigbee device; and
      on a case intended for the Zigbee device.

4. The method according to claim 1, wherein reading the Zigbee install code from the Zigbee device via the radio interface is carried out using an IEEE 802.15.4 protocol.

5. The method according to claim 1, wherein the radio interface is configured to be communicatively connected to a printing system external to the Zigbee device.

6. The method of claim 1, further comprising:
   before printing the read Zigbee install code, converting the read Zigbee install code into a graphical representation.

7. The method of claim 1, wherein the read Zigbee install code is printed in at least one of:
   a quick-response (QR) code representation; and
   a hexadecimal representation.

8. The method of claim 1, wherein the Zigbee install code further comprises:
   a media access control (MAC) address of the Zigbee device; and
   at least one of:
      a manufacturer ID for the Zigbee device;
      a device ID for the Zigbee device;
      a device type of the Zigbee device;
      a firmware version of the Zigbee device; and
      a production date of the Zigbee device.

9. The method of claim 1, wherein once the Zigbee device has entered the second mode of operation, said Zigbee device permanently remains in the second mode of operation and cannot transition back to the first mode of operation without erasure of the Zigbee device.

10. The method of claim 1, wherein causing the Zigbee device to enter the first mode of operation occurs upon a first powering up of the Zigbee device.

11. The method of claim 1, wherein transmission of the command signal from the radio interface external to the Zigbee device only occurs once the Zigbee install code has been successfully read from the Zigbee device.

12. The method of claim 1, wherein transmission of the command signal from the radio interface external to the Zigbee device only occurs once the Zigbee install code has been successfully printed on the Zigbee device or on a case intended for the Zigbee device.

13. The method of claim 1, wherein the Zigbee install code further comprises a 64-bit extended unique identifier (EUI64) associated with the Zigbee device.

14. The method of claim 13, further comprising:
   before printing the read Zigbee install code, converting both the read Zigbee install code and the EUI64 into a graphical representation.

15. The method of claim 1, wherein reading the Zigbee install code from the Zigbee device via the radio interface in the first mode of operation occurs when any connection terminals which otherwise would allow for reading the Zigbee install code by physical connection therewith are not or no longer physically accessible.

16. The method of claim 15, wherein the Zigbee device is in a fully or substantially fully assembled state.

17. The method of claim 1, wherein the Zigbee device further is Bluetooth communication compatible.

18. The method of claim 1, wherein the Zigbee device is a lighting device or a lamp.

19. A system for printing a Zigbee install code associated with a Zigbee device and required for said Zigbee device to join a Zigbee network, the system comprising:
   a radio communication unit external to the Zigbee device and configured for:
      reading the Zigbee install code from the Zigbee device via a radio interface while the Zigbee device is in a first mode of operation in which communication between the Zigbee device and the radio interface is possible; and
      transmitting a command signal to the Zigbee device which causes the Zigbee device to transition from the first mode of operation to a second mode of operation in which any attempt by unauthorized persons to read the Zigbee install code from the Zigbee device is prevented; and
   a printing system configured to be in communication with the radio communication unit and configured for subsequently printing the read Zigbee install code.

20. A Zigbee device comprising:
   at least one of a processing element and memory having stored thereat a Zigbee install code associated with the Zigbee device and required for said Zigbee device to join a Zigbee network; and
   a first radio interface configured for:
      transmitting the Zigbee install code to a second radio interface external to the Zigbee device while the Zigbee device is in a first mode of operation in which communication between the Zigbee device and the second radio interface is possible; and
      receiving a command signal from the second radio interface which causes the Zigbee device to transition from the first mode of operation to a second mode of operation in which any attempt by unauthorized persons to read the Zigbee install code from the Zigbee device is prevented;

wherein the Zigbee install code transmitted via the first radio interface is printed at least one of:
on the Zigbee device; and
on a case intended for the Zigbee device.

\* \* \* \* \*